(12) United States Patent
Cooke

(10) Patent No.: US 7,499,049 B2
(45) Date of Patent: *Mar. 3, 2009

(54) RELATIVE GEOMETRY SYSTEM AND METHOD

(75) Inventor: Steven W Cooke, Ballwin, MO (US)

(73) Assignee: The Boeing Company, Chicago, IL (US)

( * ) Notice: Subject to any disclaimer, the term of this patent is extended or adjusted under 35 U.S.C. 154(b) by 46 days.

This patent is subject to a terminal disclaimer.

(21) Appl. No.: 11/862,998

(22) Filed: Sep. 27, 2007

(65) Prior Publication Data

US 2008/0024492 A1      Jan. 31, 2008

Related U.S. Application Data

(63) Continuation of application No. 10/192,979, filed on Jul. 10, 2002, now Pat. No. 7,412,364.

(51) Int. Cl.
*G06T 17/00* (2006.01)
(52) U.S. Cl. ............................ 345/419; 345/427; 703/2; 703/6
(58) Field of Classification Search ........................ None
See application file for complete search history.

(56) References Cited

U.S. PATENT DOCUMENTS

| 5,499,195 | A | | 3/1996 | Castelaz |
| 6,049,341 | A | * | 4/2000 | Mitchell et al. ............. 345/473 |
| 6,053,736 | A | | 4/2000 | Huffman et al. |
| 6,067,041 | A | | 5/2000 | Kaiser et al. |
| 6,433,729 | B1 | * | 8/2002 | Staggs ........................ 342/29 |

OTHER PUBLICATIONS

Lindstrom et al, "Visualization of Large Terrains Made Easy", Proceedings of IEEE Visualization, Oct. 2001, pp. 1-11.

* cited by examiner

*Primary Examiner*—Ulka Chauhan
*Assistant Examiner*—Andrew Yang

(57) ABSTRACT

A system, method, and computer program product for reducing processing time related to relative geometry calculations performed for objects in a simulated three-dimensional environment. The method converts three-dimensional location coordinates of each object of a plurality of simulated objects in the simulated three-dimensional environment to coordinates of a two-dimensional grid. Then, a two-dimensional grid area that is associated with the scan of an object is calculated. Objects with two-dimensional grid coordinates that are collocated with the calculated area of the scan are determined and relative geometry calculations for the scan of the object determined to be collocated with the calculated area of the scan is performed.

20 Claims, 4 Drawing Sheets

RELATIVE GEOMETRY SYSTEM AND METHOD

REFERENCE TO EARLIER APPLICATION

This is a continuation of U.S. patent application Ser. No. 10/192,979, entitled "Relative Geometry System and Method", filed Jul. 10, 2004, which is incorporated by reference.

BACKGROUND

Currently, relative geometry calculations are done between all players or objects in a real-time simulated three-dimensional environment. This represents suboptimal use of available processing resources and time because many objects have little or no interaction. This becomes a significant issue as the number of objects in the real-time simulated environment increases. Because relative geometry computations grow in terms of the square of the number of entities, simulations can grow into the thousands of entities. Therefore, performing relative geometry becomes a dominant cost of a simulation. Therefore, there exist an unmet need to reduce the amount of relative geometry calculations performed in a simulation, and thus reduce the processing costs of the simulation.

SUMMARY

The present invention provides a system, method, and computer program product for reducing the number of relative geometry calculations amongst multiple objects in a simulated three-dimensional environment. The present invention can be used to improve theatre warfare simulations, spatial or celestial simulations, three-dimensional interactive games, or any other simulations that entail objects in a three-dimensional environment knowing the position of other objects in the environment.

The present invention is a system and method for reducing processing time related to relative geometry calculations performed for objects in a simulated three-dimensional environment. The method converts the three-dimensional location coordinates of each object of a plurality of simulated objects in the simulated three-dimensional environment to coordinates of a two-dimensional grid. Then, a two-dimensional grid area that is associated with the scan of an object is calculated. Objects with two-dimensional grid coordinates that are collocated with the calculated area of the scan are determined and relative geometry calculations for the scan of the object determined to be collocated with the calculated area of the scan is performed.

Thus, relative geometry calculations are only performed on objects that have the greatest likelihood of having a location in the three-dimensional environment that is within another object's scan. By reducing the amount of relative geometry calculations that are performed, system costs are reduced because less processing needs to occur.

BRIEF DESCRIPTION OF THE DRAWINGS

The teachings herein are described with reference to the accompanying figures. In the figures, the left-most reference number digit(s) identifies the figure in which the reference number first appears. The use of the same reference numbers in different figures indicates similar or identical items.

DETAILED DESCRIPTION

Figure 1:
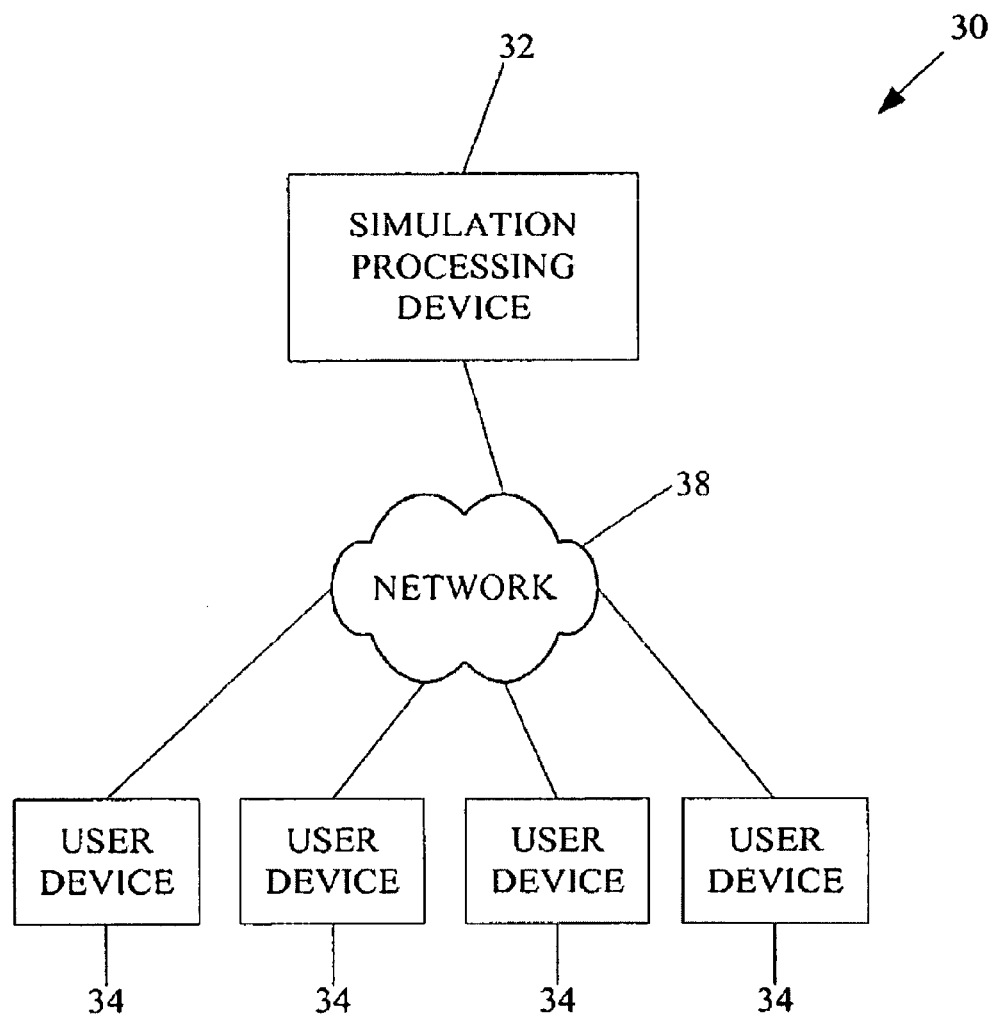
FIG. 1 is a block diagram of an illustrative system in accordance with an embodiment.

FIG. 1 illustrates an illustrative simulation system 30 for generating a three-dimensional simulation. The simulation system 30 includes a simulation processing device 32 and a plurality of user simulation devices 34 coupled to the simulation processing device 32 over a public or private data network 38. Each user simulation device 34 controls one or more objects that are present in a simulated three-dimensional environment that is generated and maintained by the simulation processing device 32.

The simulation processing device 32 also maintains the location and status of objects not associated with a user simulation device 34. The user simulation devices 34 are suitably computer-based systems that include a user interface (not shown) for controlling the object or objects associated with the user simulation device 34 and a display (not shown) for presenting results of a sensor scan, if the associated object performs a scan within the simulated three-dimensional environment. The device 34 can be associated with a plurality of different types of sensor scans.

Types of scans include a simulated visual scan, a simulated pencil beam radar scan, a simulated fan beam radar scan, a visual scan, or any other type of scan. The simulation processing device 32 determines what other objects in the simulated three-dimensional environment appear within each object's scan. At periodic time intervals, the simulation processing device 32 performs the scan determination for all object scans in the simulated three-dimensional environment. The scan results are sent to the associated user simulation device 34 for presentation on the display.

Figure 2:
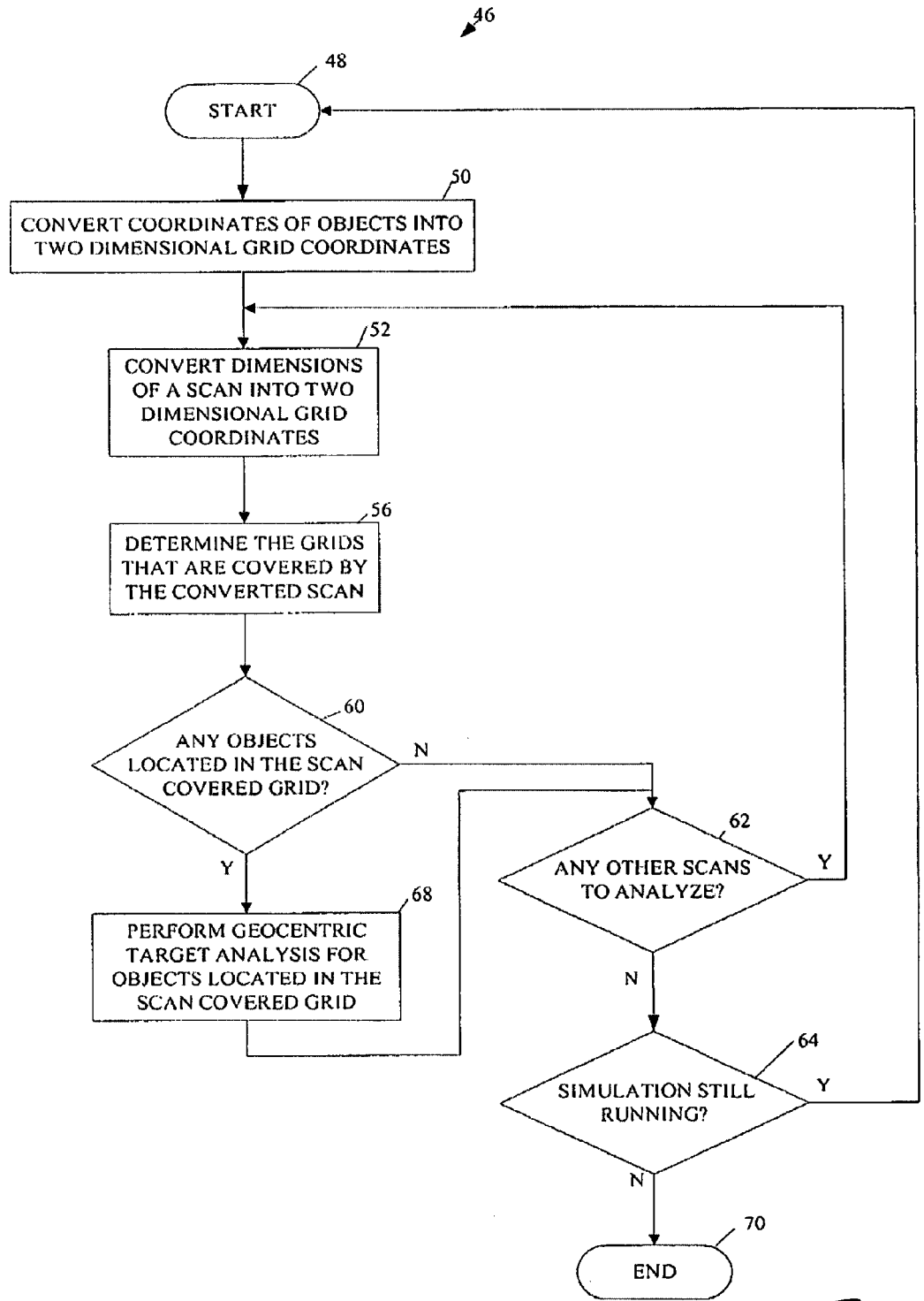
FIG. 2 is a block diagram illustrating a process of relative geometry calculation in accordance with an embodiment.
Figure 3:
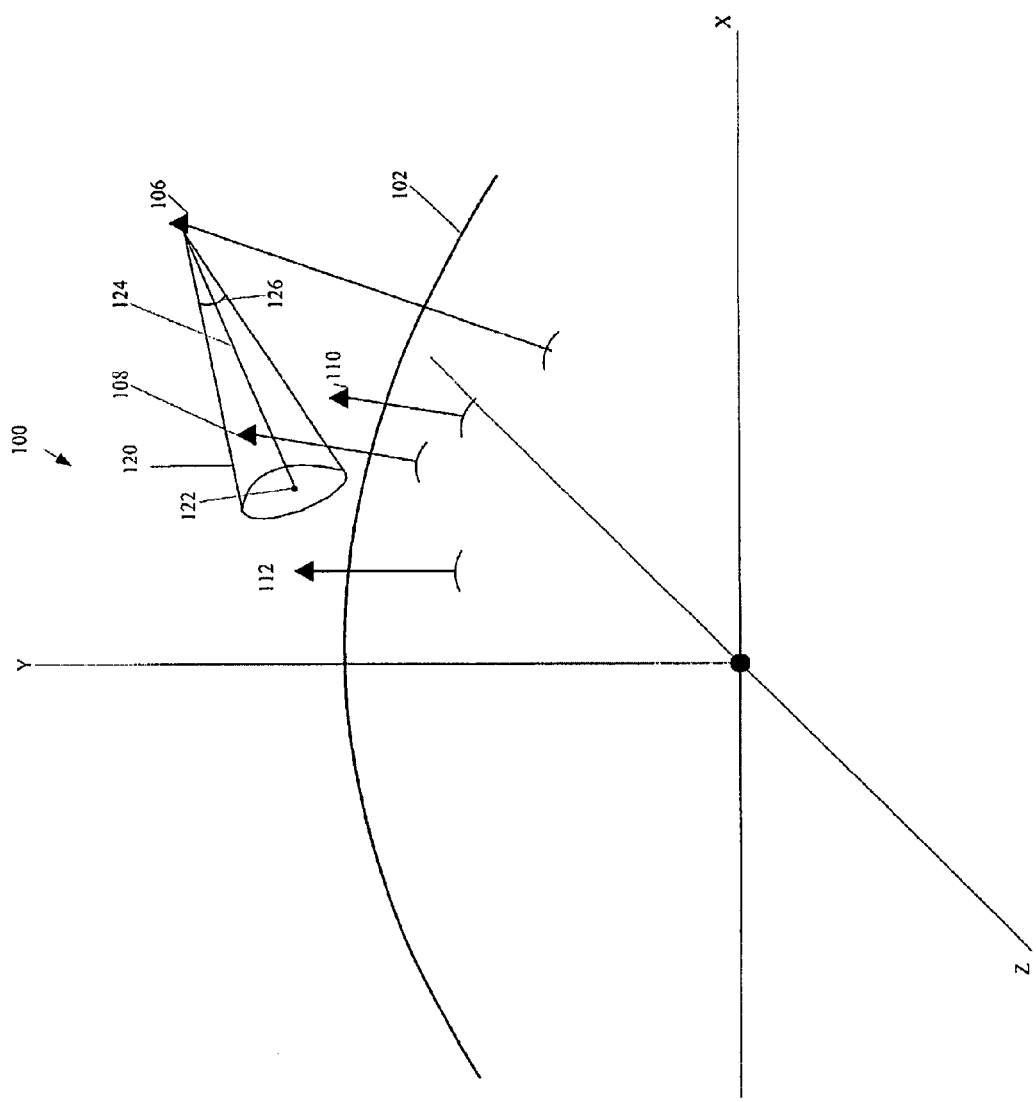
FIG. 3 depicts an illustrative simulated three-dimensional environment.
Figure 4:
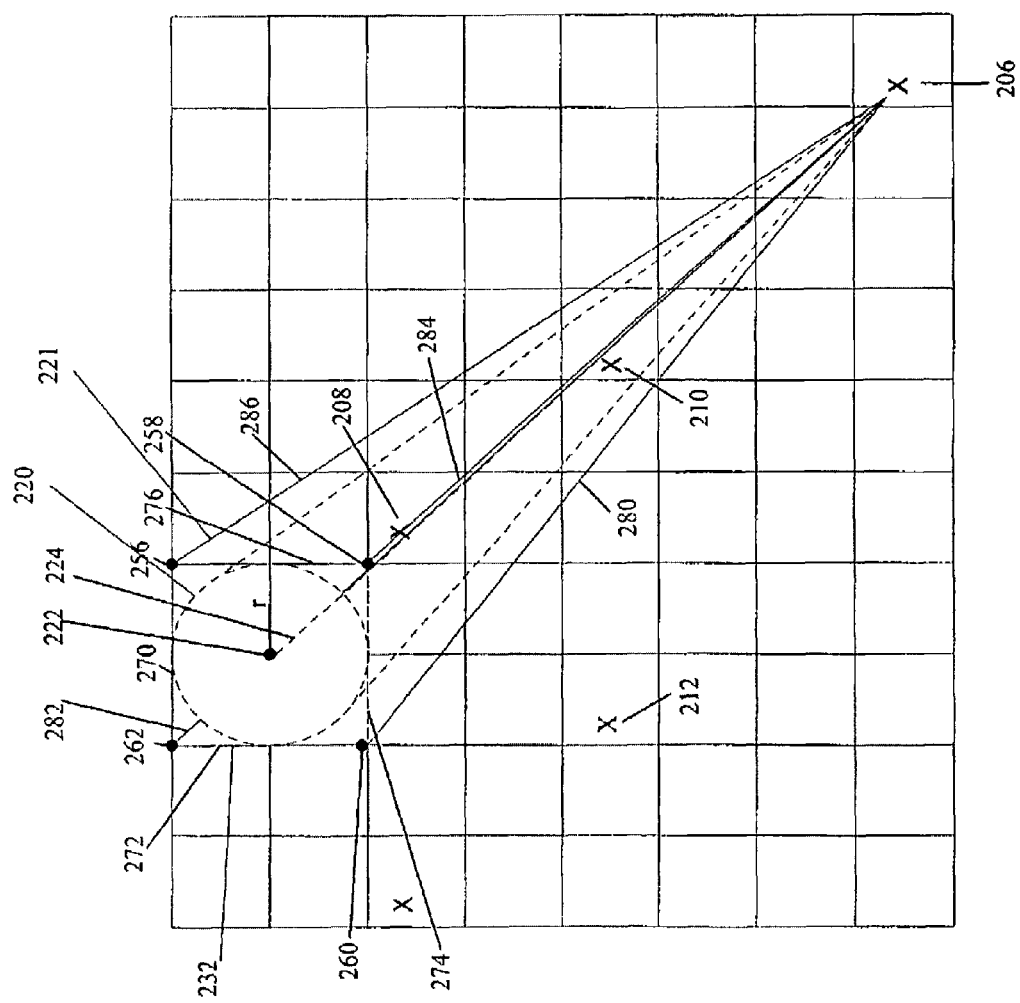
FIG. 4 depicts an illustrative two-dimensional grid representation of the environment shown in FIG. 3.

The process for performing the determination of whether objects are within each object's scan is described in the flow diagram of FIG. 2 and by example in FIGS. 3-4. As will be appreciated, the processing performed by the simulation processing device 32 and the plurality of user simulation devices 34 can be distributed to one or more other devices over the network 38 or over another network. Non-limiting examples of devices 32 and 34 are general purpose computers.

FIG. 2 depicts an illustrative process 46 performed by the simulation processing device 32 as shown in FIG. 1, or by any other device which is controlling a simulated three-dimensional environment that includes a plurality of interacting objects. The simulation processing device 32 maintains the position status of all objects within the simulated three-dimensional environment based on position values relative to three orthogonal axes (X, Y, Z) that all have their origin at the center of the earth, (i.e. geocentric coordinates) such as described by the World Geodetic System-84 (WGS-84). In other words, object positions are defined by geocentric coordinates The process 46 begins at a block 48. At block 50, the simulation processing device 32 or a component of the simulation application program running on a user simulation device 34 converts the geocentric coordinates of each object into coordinates of a two-dimensional grid. The two-dimensional grid is a predefined planar grid that is suitably tangent with the earth at a geocentric point on the surface of the earth. It will be appreciated that two-dimensional grids at other locations relative to the earth can be used. The predefined tangent point for the two-dimensional grid is selected based on an approximate center location of all the objects within the simulated three-dimensional environment. Some of the objects perform a scan of the simulated three-dimensional environment. Each scan occupies a volume of space in the simulated three-dimensional environment. At a block 52, each scan volume is converted into an area on the two-dimensional grid. Converting a three-dimensional scan volume into the two-dimensional grid depends on the type of scan. If the scan is a visual scan, the range value of the scan converts to a circular area around the object's two-dimensional grid location according to a predefined scan range value. For the pencil and fan beam scans, the location in geocentric coordinates of the end of the scan's line-of-sight is known based on a predefined scan range value and a geocentric line-of-sight direction vector. The end of the line-of-sight is converted into two-dimensional grid coordinates. Then, an approximate two-dimensional shape of the end of the scan is determined based on a known beam width angle for a pencil beam scan and a beam width angle and an elevation angle for the fan beam scan. The shape of the end of the scan is connected to the origin of the scan for approximately defining the area that the scan covers in the two-dimensional grid.

At a block 56, the simulation processing device 32 determines which grid areas in the two-dimensional grid are fully or partially covered by the area of a two-dimensional representation of the scan. A non-limiting example of performing this covered grid determination is by creating a table for each row of the grid with two columns. Each of the lines that define the scan in two dimensional grid coordinates are analyzed to determine what grid areas they pass through. For each row of the grid the left most and right most grid areas are determined based on the analyzed lines.

Then, at a decision block 60, the simulation processing device 32 determines if any other objects with two-dimensional grid locations are within the two-dimensional grid area that is fully or partially covered by the scan. If there are objects located in grid areas fully or partially covered by the scan, the simulation processing device 32 performs target analysis in geocentric coordinates for those objects, at a block 68. At a decision block 62, once all the objects sharing the same two-dimensional grid areas with the scan have been processed or if no objects were found in the area of the scan, as determined in the decision block 60, the simulation processing device 32 continues checking other scans for objects that could be possible targets of the scan. Once all the scans have been analyzed, then, at a decision block 64, a determination is made whether the simulation is still executing. If the simulation is still executing, then the process 46 returns to the block 48 for processing at a next time interval. If the simulation is no longer executing, the process 46 stops at a block 70.

As will be shown and described in the example in FIGS. 3 and 4, the present invention quickly eliminates most unaffected objects in a simulated three-dimensional environment from having to go through a geocentric analysis (relative geometry calculation) for every scan.

FIGS. 3 and 4 illustrate an exemplary simulation and a visual example of the processing performed at blocks 50, 52, 56, and 60 from FIG. 2. FIG. 3 illustrates a perspective view of a non-limiting example simulated three-dimensional environment 100 with a plurality of objects interacting in the environment 100 on or above a simulated curved earth surface 102. In the environment 100, each object includes geocentric coordinates relative to the X, Y, and Z axes. In this example, an object 106 includes a three-dimensional pencil beam scan pattern 120 that passes over but does not come in contact with an object 110. The scan pattern 120 does encompass an object 108.

FIG. 4 illustrates some of the objects shown in FIG. 3 at converted locations on a two-dimensional grid plane. A two-dimensional grid object 206 is the two-dimensional grid location for the object 106 from FIG. 3. The following are two-dimensional grid object and three-dimensional grid object relationships:

Object 108=>Object 208
Object 110=>Object 210
Object 112=>Object 212

A scan outline 220 shows how the scan 120 produced by object 106 directly converts to the grid plane. The scan outline 220 in FIG. 4 is not directly converted into a shape in the grid plane. A two-dimensional scan area 221 that encompasses the scan outline 220 is determined. The following describes the construction of the area 221. The processing device 32 determines the location in the grid plane for an end point 122 of a line-of-sight 124 for the scan 120 (FIG. 3). The end point 122 is defined in geocentric coordinates according to a known scan range value and the three-dimensional line-of-sight direction (vector) of the scan 120. After the geocentric coordinates for the end point 122 of the scan are determined, the end point 122 is mapped to the grid plane, (see end 25 point 222; FIG. 4). A radius value r at the end point 222 is determined by multiplying the scan range (distance from scan source to the end point 122) by the sine of one-half the beam width angle 126 of the scan 120 (FIG. 3).

The beam width angle 126 is a preknown value of the scan 120. Then, the radius r is added to the X value of the location of the end point 222 to get an edge point 220. The radius r is added to the Y axis value of the edge point 228 to identify a first corner 230 of a box 232 that sufficiently encompasses the end of the pencil beam scan. The other corners 234, 236, and 238 of the box 232 are calculated by adding or subtracting the radius r to either the X or Y axis coordinates accordingly. The edge lines 270, 272, 274 and 276 of the box 232 are determined using the corners 230-238. The remaining boundaries of the area 221 are defined by lines 280, 282, 284 and 286 that traverse from the box corners 234-238 to the origin (object 206) of the scan. The scan area 221 (region of the scan) is defined by lines 270-276 and 280-286.

The simulation processing device 32 determines the grid regions that are fully or partially covered by lines 270-286. Then, the simulation processing device 32 determines if any objects have grid plane locations that are located in the fully or partially covered grid areas. Objects 208 and 210 are determined to be located within grid areas that are defined as being fully or partially covered by the lines 270-286. Therefore, because only objects 108 and 110 are identified within the two-dimensional scan area, they are the only objects within the simulated three-dimensional environment 100 that are further processed in geocentric coordinates to determine if the actual three-dimensional scan pattern 120 does target the object.

CONCLUSION

Although the subject matter has been described in language specific to certain features and/or methodical acts, it is to be understood that the subject matter defined in the appended claims is not limited to the specific features or acts described above. Rather the specific features and acts described above are disclosed as example forms of implementing the claimed subject matter.

What is claimed is:

1. A method comprising using a computer to reduce the number of geometry calculations to simulate a three-dimensional environment, the method including:
   converting an object's three-dimensional location coordinates to two-dimensional location coordinates, the object being located in a simulated three-dimensional environment;
   converting a three-dimensional scan volume to a two-dimensional scan area, the scan volume corresponding to a scan emanating from an object located in the simulated three-dimensional environment;
   determining the two-dimensional location coordinates for objects located in the two-dimensional scan area; and
   determining movements for only those objects located in the two-dimensional scan area using the objects two-dimensional location coordinates.

2. The method of claim 1, wherein the two-dimensional location coordinates are in two-dimensional grid coordinates.

3. The method of claim 1, wherein the scan comprises at least one of a visual scan, a radar scan, or a sensor scan.

4. The method of claim 1, wherein converting a three-dimensional scan volume to a two-dimensional scan area is based on at least one of the scans range, the scans line-of-sight, the scans width angle, or the scans elevation angle.

5. The method of claim 1, wherein the objects located in the two-dimensional scan area are fully or partially covered by the two-dimensional scan area.

6. The method of claim 1, wherein the objects are players or objects in a computer simulation.

7. The method of claim 1, further comprising scanning the simulated three-dimensional environment for other objects.

8. A computer-executable method comprising using a computer to detect an object in a simulated three-dimensional environment, the method including:
   scanning the simulated three-dimensional environment, the scan emanating from an object located in the simulated three-dimensional environment;
   calculating a two-dimensional scan outline for the three-dimensional scan;
   calculating a two-dimensional scan area from the two-dimensional scan outline by:
   determining two-dimensional coordinates for a scan's end point;
   calculating a scan radius by multiplying a scan's range by a sine of one-half a scan beams width angle; and
   calculating a plurality of edge points by adding the scan radius to the two-dimensional coordinates for the scans endpoint and subtracting the scan radius from the two-dimensional coordinates for the scans endpoint; and
   determining if simulated objects are located within the two-dimensional scan area.

9. The method of claim 8, wherein the two-dimensional coordinates are in two-dimensional grid coordinates.

10. The method of claim 8, wherein the scan's end point is calculated based on the scan's range and scan's line-of-sight vector.

11. The method of claim 8, wherein the scan's range is the distance from a scan's source to the scan's endpoint.

12. The method of claim 8, wherein the simulated object is fully or partially located within the two-dimensional scan area.

13. The method of claim 8, wherein the objects are players or objects in a computer simulation.

14. A system for generating a three-dimensional simulation comprising:
   a processor for creating a simulated three dimensional environment; and
   a user simulation device associated with an object displayed in the simulated three-dimensional environment, wherein the processor is configured to:
   convert the object's three-dimensional location coordinates to two-dimensional location coordinates, the object being located in the simulated three-dimensional environment;
   convert a three-dimensional scan volume to a two-dimensional scan area, the three-dimensional scan volume corresponding to a scan emanating from an object located in the simulated three-dimensional environment;
   determine two-dimensional location coordinates for objects located in the two-dimensional scan area; and
   determine movements for only those objects located in the two-dimensional scan area using the objects two-dimensional location coordinates.

15. The system of claim 14, wherein the two-dimensional location coordinates are in two-dimensional grid coordinates.

16. The system of claim 14, wherein the scan comprises at least one of a visual scan, a radar scan, or a sensor scan.

17. The system of claim 14, wherein converting the three-dimensional scan volume to the two-dimensional scan area is based on at least one of the scans range, the scans line-of-sight, the scans width angle, or the scans elevation angle.

18. The system of claim 14, wherein the objects located in the two-dimensional scan area are fully or partially covered by the two-dimensional scan area.

19. The system of claim 14, wherein the objects are players or objects in a computer simulation.

20. The system of claim 14, wherein the processor is configured to scan the simulated three-dimensional environment for other objects.

* * * * *